United States Patent
Seibt et al.

(10) Patent No.: US 8,162,102 B2
(45) Date of Patent: Apr. 24, 2012

(54) VACUUM WASTE-WATER SYSTEM SOUND-ABSORBER

(75) Inventors: Christian Seibt, Buchholz (DE); Cord Walter, Hildesheim (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 12/970,472

(22) Filed: Dec. 16, 2010

(65) Prior Publication Data

US 2011/0147117 A1 Jun. 23, 2011

Related U.S. Application Data

(60) Provisional application No. 61/289,063, filed on Dec. 22, 2009.

(30) Foreign Application Priority Data

Dec. 22, 2009 (DE) .......................... 10 2009 060 081

(51) Int. Cl.
*E03D 1/30* (2006.01)

(52) U.S. Cl. ........................ 181/234; 181/233
(58) Field of Classification Search .................. 181/233, 181/234, 252, 227, 228, 247, 256
See application file for complete search history.

(56) References Cited

U.S. PATENT DOCUMENTS

| | | | | |
|---|---|---|---|---|
| 3,642,093 A | * | 2/1972 | Schach | 181/239 |
| 4,635,751 A | * | 1/1987 | Howell | 181/234 |
| 4,742,889 A | * | 5/1988 | Rodriguez | 181/233 |
| 5,165,457 A | * | 11/1992 | Olin et al. | 4/300 |
| 6,209,678 B1 | * | 4/2001 | Sterling | 181/230 |
| 6,810,904 B2 | * | 11/2004 | Figueiredo et al. | 137/436 |
| 7,364,011 B2 | * | 4/2008 | Hirschorn et al. | 181/248 |
| 7,810,609 B2 | * | 10/2010 | Sikes et al. | 181/250 |
| 7,934,581 B2 | * | 5/2011 | Kim et al. | 181/250 |
| 2009/0165197 A1 | | 7/2009 | Seibt | |
| 2010/0180369 A1 | * | 7/2010 | Seibt | 4/431 |

FOREIGN PATENT DOCUMENTS

| | | |
|---|---|---|
| DE | 9100416 U1 | 4/1991 |
| DE | 102007061255 A1 | 7/2009 |
| GB | 2266340 A * | 10/1993 |
| JP | 05222912 A * | 8/1993 |

OTHER PUBLICATIONS

Components for sound insulation found at www.milde-industrietechnik.de/kompo.inventornenten-fuer-denschallschutz.html (published no later than Dec. 3, 2009).
Round housing found at www.mwh.ch/mwhbarcolair/downloads/produkteuebersicht.pdf, on Dec. 30, 2010 found on www.mwh.ch/de/Lueftungskomponenten_und_weitere_Klimasysteme/Schalldaempfer/Rohrschalldaempfer_rund S11S41.pdf (published no later than Dec. 3, 2009).

* cited by examiner

*Primary Examiner* — Forrest M Phillips
(74) *Attorney, Agent, or Firm* — Lerner, David, Littenberg, Krumholz & Mentlik, LLP

(57) ABSTRACT

A vacuum waste-water system sound-absorber includes a connection stub for a vacuum waste-water system and an aspiration air duct, wherein the aspiration air duct is radially delimited by a pipe, wherein the pipe is delimited at an interior of the aspiration air duct by an internal wall and is delimited at an exterior of the aspiration air duct by an external wall, wherein the internal wall comprises openings in a radial direction, wherein the external wall comprises openings in radial direction, wherein a sound-absorbent material is arranged between the internal wall and the external wall.

12 Claims, 8 Drawing Sheets

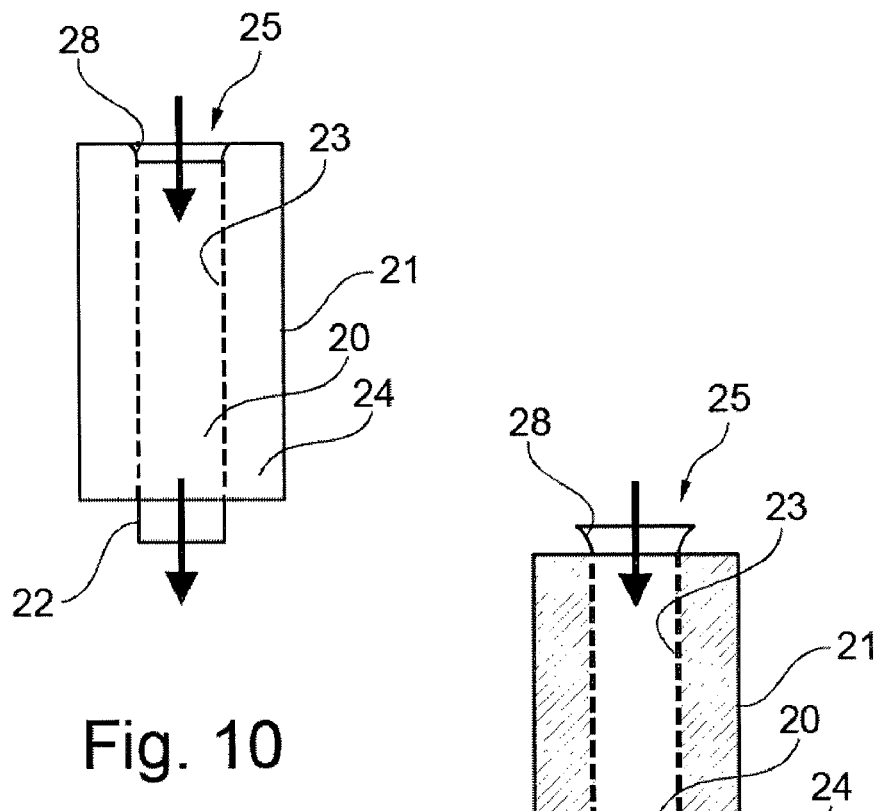
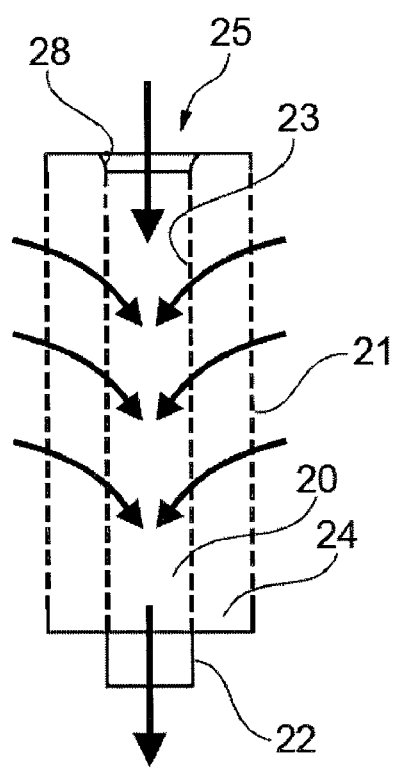
Fig. 10
Fig. 11
Fig. 12

VACUUM WASTE-WATER SYSTEM SOUND-ABSORBER

CROSS-REFERENCE TO RELATED APPLICATIONS

This application claims the benefit of the filing date of U.S. Provisional Patent Application No. 61/289,063 filed Dec. 22, 2009, the disclosure of which is hereby incorporated herein by reference.

BACKGROUND OF THE INVENTION

The invention relates to a vacuum waste-water system sound-absorber and to a sound absorber system to reduce sound in a vacuum system, in particular in order to reduce sound emissions from connected devices (toilet, urinal, galley waste-disposal unit, (GDWU) etc.) to the pipelines of a vacuum system in an aircraft.

Known devices for a vacuum system require the triggering of a flushing procedure after use, by operating a triggering device. Thereafter, flushing fluid is fed to the collection container and subsequently a suction valve is opened in order to feed liquids and other matter to the region of a waste water tank. In this arrangement the transport procedure usually takes place by an airflow, caused by a pressure differential between the waste water tank and the place where the devices are located. During the suction process considerable sound emission occurs in conventional devices as a result of the airflows caused in the suction process.

In industry, sound absorbers are known which however, due to their design size, weight, pressure loss, behaviour during fluctuations in pressure, reliability and service life, must not be used in aviation.

BRIEF SUMMARY OF THE INVENTION

The present invention provides for a vacuum waste-water system sound-absorber having a lightweight construction and small dimensions and providing reduced sound emission in vacuum waste-water systems.

According to an exemplary embodiment of the invention, a vacuum waste-water system sound-absorber is provided, comprising a connection stub for a vacuum waste-water system and an aspiration air duct, wherein the aspiration air duct is radially delimited by a pipe, wherein the pipe is delimited towards the interior towards the aspiration air duct by an internal wall, and is delimited towards the exterior by an external wall, wherein the internal wall comprises openings in radial direction, wherein the external wall comprises openings in radial direction, wherein between the internal wall and the external wall a sound-absorbent material is arranged.

In this manner with a particular design size an increased through-flow of aspiration air may be achieved. The aspiration air may flow not only along the aspiration air duct, i.e. in axial direction relative to the aspiration stub, but also in radial direction through the opening or openings provided in the pipe. In this arrangement the sound-absorbent material may be subjected to a through-flow if it is correspondingly designed so as to be air-permeable, or it may be subjected to a flow-around if it comprises corresponding flow-around zones.

According to an exemplary embodiment of the invention, a vacuum waste-water system sound-absorber is provided in which the pipe is a double-walled pipe with an internal pipe and an external pipe, wherein the internal wall of the pipe is an internal pipe, and the external wall of the pipe is an external pipe, wherein the internal pipe is radially spaced apart from the external pipe.

In this manner the pipe with the sound-absorbent material may be mechanically stabilised in that the sound-absorbent material may be positioned between the internal pipe and the external pipe.

According to an exemplary embodiment of the invention, a vacuum waste-water system sound-absorber is provided in which the openings of the internal pipe are designed as a two-dimensional perforation, wherein the openings of the external pipe are designed as a two-dimensional perforation, wherein the sound-absorbent material is arranged along the entire circumference between the internal pipe and the external pipe and is permeable to the flowing air.

In this manner a two-dimensional inflow over the external pipe through the sound-absorbent material and through the internal pipe into the aspiration duct may take place. Perforation of the openings makes for air permeability while at the same time providing stability to the external pipe and to the internal pipe.

According to an exemplary embodiment of the invention, a vacuum waste-water system sound-absorber is provided in which a barrier layer is provided between the sound-absorbent material and the internal pipe.

In this manner a situation is prevented in which particles enter the aspiration air duct during the aspiration of air. Such particles may be extraneous particles or particles that have become separated from the sound-absorbent material. The barrier layer may furthermore prevent sound-absorbent material from being ingested into the air aspiration duct through the opening or openings of the internal pipe. By an increase in the percentage of holes in the perforated sheet, e.g. by a perforated internal pipe, it is possible to save weight.

According to an exemplary embodiment of the invention, a vacuum waste-water system sound-absorber is provided in which the internal pipe and the external pipe are positioned relative to each other by the sound-absorbent material.

In this manner an upper and a lower sound absorber cover may be done without, which reduces the weight of the entire arrangement. The internal pipe and the external pipe may be positioned by jamming, gluing or foaming the sound-absorbent material into place.

According to an exemplary embodiment of the invention, a vacuum waste-water system sound-absorber is provided in which a free space is provided between the sound-absorbent material and the internal pipe.

In this manner a layered sound-absorbent medium may be provided. In this arrangement the free space may be used as a resonance space in order to attenuate particular frequencies that may not be able to be attenuated by the sound-absorbent material. However, the free space may also comprise a second sound-absorbent material that differs from the sound-absorbent material located on the outside. It is thus possible to set particular attenuation characteristics.

According to an exemplary embodiment of the invention, a vacuum waste-water system sound-absorber is provided in which the openings of the internal wall are of a segment-shaped design, wherein the openings of the external wall are of a segment-shaped design, wherein in the sound-absorbent material in radial direction there are continuous recesses which respectively correspond to an opening of the internal pipe and an opening of the external pipe.

In this manner a splitter sound absorber may be provided in which more or less radially extending aspiration ducts arise that lead to the aspiration air duct. In this arrangement sound absorption takes place on the interior wall faces of the radial aspiration ducts. The aspiration ducts may be designed so as to taper off in the direction of the aspiration air duct. In this arrangement the cross section of the ducts may be rectangular.

According to an exemplary embodiment of the invention, a vacuum waste-water system sound-absorber is provided in which the sound-absorbent material comprises a plural number of splitters.

For example, in the case of a variation in width, a plural number of splitters makes it possible to adapt the attenuation characteristics. If necessary the splitters may also be exchanged.

According to an exemplary embodiment of the invention, a vacuum waste-water system sound-absorber is provided in which the corresponding openings of the internal wall and of the external wall are circumferentially offset relative to each other, and the recesses comprise a design that is spiral-shaped in radial direction.

An offset of the openings between the external opening and the internal opening makes it possible to position the duct that is situated in between so that it is positioned at an incline. Consequently the duct may be designed so as to be longer in order to achieve improved sound absorption. Furthermore, with a radially inclined position a flow vortex may be generated that may also have a sound-reducing effect because in some circumstances a laminar flow may be generated in the aspiration duct.

According to an exemplary embodiment of the invention, a vacuum waste-water system sound-absorber is provided in which between the internal wall and the external wall a flow guide device is arranged on the side of the aspiration stub, which flow guide device gradually tapers off towards the aspiration stub.

In this manner a flow in the sound absorber housing may be kept so that it remains laminar and so that sound-generating turbulence is prevented. Generally speaking, the flow resistance will also be reduced.

According to an exemplary embodiment of the invention, a vacuum waste-water system sound-absorber is provided in which the aspiration air duct on the side facing away from the connection stub comprises an aspiration opening that comprises an aspiration funnel that widens in the axially-outward direction.

In this manner a flow at the sound-absorber aspiration opening may be kept so that it remains laminar and so that noise-causing turbulence is prevented. Generally speaking, the flow resistance will also be reduced.

According to an exemplary embodiment of the invention, a vacuum waste-water system sound-absorber is provided in which a resonance chamber is provided between the aspiration air duct and the connection stub.

In this manner a combination of a pipe sound absorber and a resonance sound absorber may be achieved. Arranging the resonance chamber on the end facing away from the aspiration opening has been proven to be advantageous from the point of view of sound absorption aspects.

According to an exemplary embodiment of the invention, a vacuum waste-water system is provided with a vacuum waste-water system sound-absorber according to the invention in which vacuum waste-water system sound-absorber the connection stub is coupled to an air aspiration pipe.

The individual features may of course also be combined, as a result of which, in part, advantageous effects may arise which exceed the sum of the individual effects.

These and other aspects of the present invention are explained and clarified with reference to the exemplary embodiments described below.

BRIEF DESCRIPTION OF THE DRAWINGS

Exemplary embodiments are described below with reference to the following drawings.

FIG. 10 diagrammatically shows the design of the pipe sound absorber with an integrated optimised sound-absorber air inlet.

FIG. 11 diagrammatically shows the design of the pipe sound absorber with an additional air inlet funnel.

FIG. 12 diagrammatically shows the design of the pipe sound absorber with a bidirectional flow through the sound absorber.

Below, exemplary embodiments of the invention are described with reference to the drawings.

DETAILED DESCRIPTION

The inventive sound absorber system for vacuum systems may in principle be used at several installation positions of the vacuum system and connected devices. In particular exemplary embodiments the sound absorber system according to the invention is used in the main flow line of a vacuum device with a secondary flow line (FIG. 1), in the main flow line of a vacuum device (FIG. 2) and/or in the main flow line of a vacuum-system air supply unit (FIG. 3).

Figure 1:
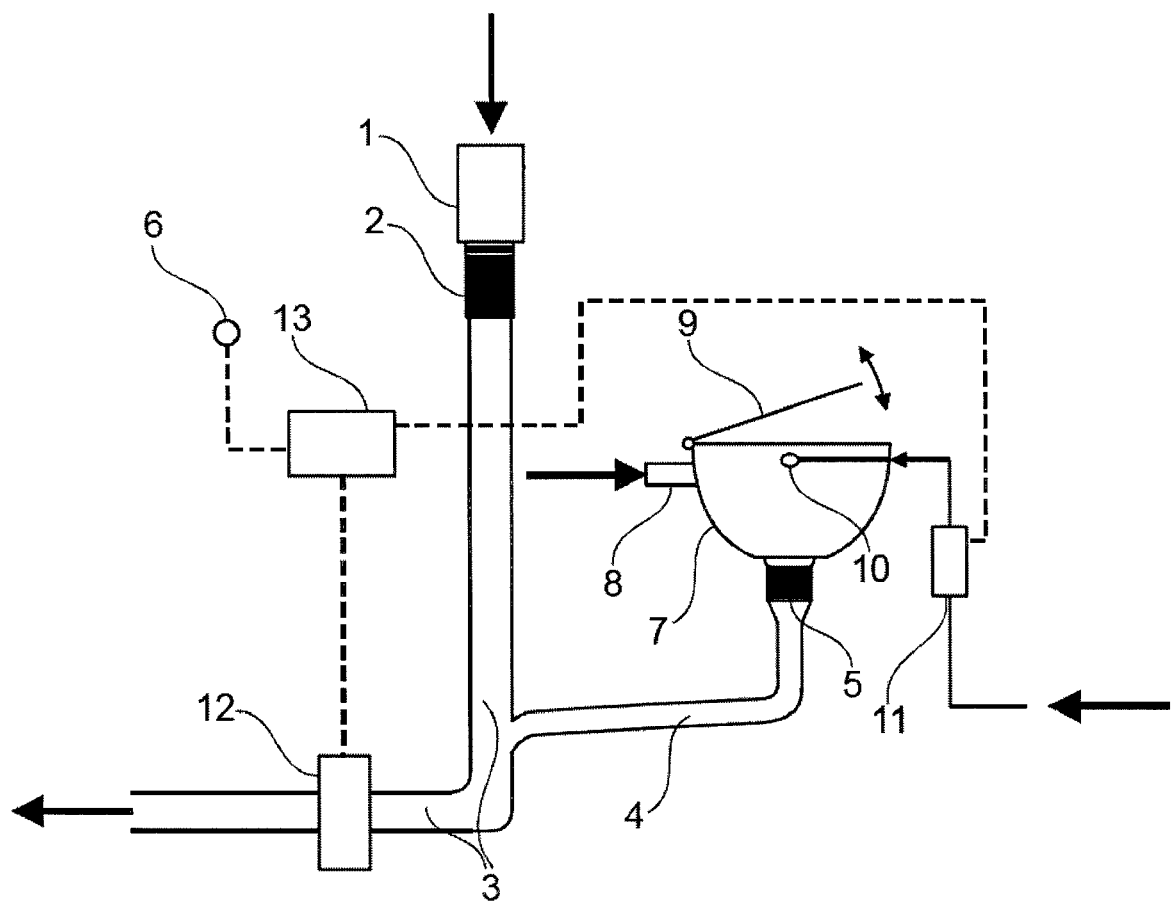
FIG. 1 diagrammatically shows the application of the sound absorber system according to the invention in the main flow line (bypass concept) of a vacuum device with a secondary flow line.
Figure 2:
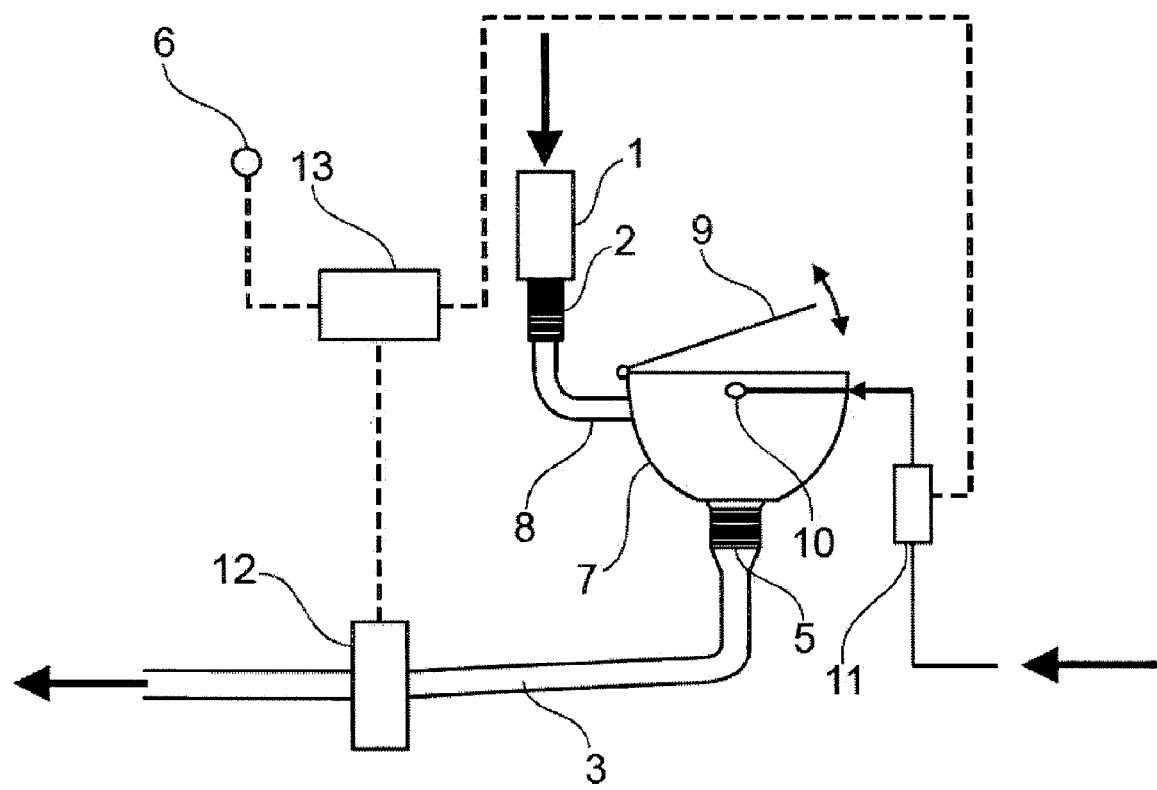
FIG. 2 diagrammatically shows the application of the sound absorber system according to the invention in the main flow line of a vacuum device.
Figure 3:
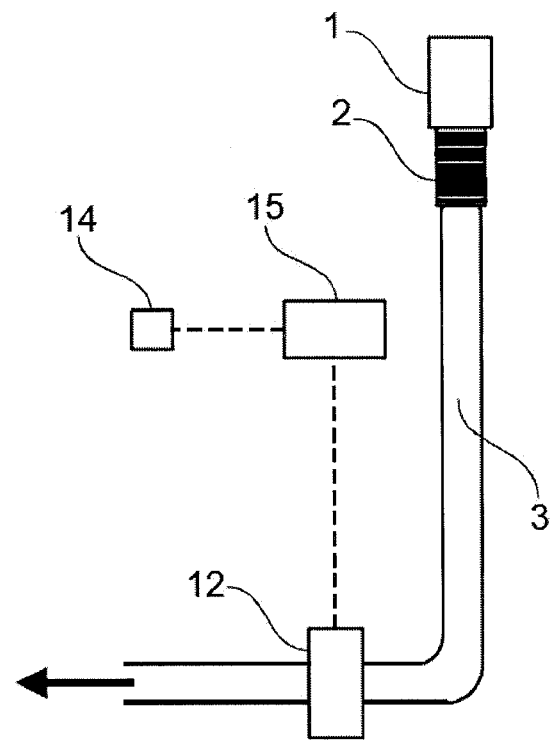
FIG. 3 diagrammatically shows the application of the sound absorber system according to the invention in the main flow line of a vacuum-system air supply unit.

With reference to FIGS. 1 to 3 the field of application of a sound absorber according to the invention is described using the example of a sound absorber system in the main flow line (bypass concept) with a secondary flow line of a device unit. The system according to FIG. 1 comprises a collection container 7 with a discharge that is connected to a secondary flow line 4, and a main flow line 3 into which the secondary flow line 4 flows, and the main flow line 3 which may be connected to a vacuum system by way of a suction valve 12. The secondary flow line 4 is connected to the main flow line 3 by way of a coupling. A flushing-water supply with a flush valve 11 may be provided, which during a flushing-suction process feeds flushing water to the collection container 7. One end of the main flow line 3 is connected to the suction valve 12, while the other end is connected to an optional odour seal 2 that is designed to prevent unpleasant odours leaking from the main flow line 3 to the outside. Analogously the odour seal in the discharge collection container 5 prevents unpleasant odours leaking from the pipe architecture to the outside. The system may comprise a control unit 13 that controls the flush valve 11 and the suction valve 12.

In a suction process the main air stream is fed through the main flow line 3 that is coupled to the vacuum system by way of the suction valve 12. With the use of a main flow line 3 (bypass concept) it is possible to feed only a small air flow through the collection container or, in the case of the cover being closed, through the ventilation pipe 8 of the collection container. The essential conveyance of waste to the vacuum system is implemented with the required air flow in the main flow line 3. In this way noise development may be very significantly reduced as a result of the weak flow of air from the discharge of the collection container 7.

The remaining device interference noises from the main flow line 3 may be further reduced by a sound absorber system at the end of the main flow line 3, which end supplies ambient air, so that only slight perceptible sound emissions on the main flow line 3 arise. The greatest airflow is fed by way of the main flow line 3. The resulting high flow speed, which depends on the pipe cross section, in the main flow line requires components that favour flow, in order to ensure optimum conveyance into the vacuum system, to reduce the sound pressure level and to prevent tonal components to the greatest extent possible.

Further applications of this sound absorber system are also imaginable in the vacuum system, in particular in units (vacuum-system air supply unit) which in the vacuum system assume the function of a targeted differential pressure control system or differential pressure regulating system of the vacuum system.

The inventive sound absorber system for vacuum systems achieves a broad-band reduction in the arising flow sounds from the vacuum system and/or the vacuum device. Attenuation of the sound absorber system is designed, in particular, to deal with medium and high frequencies of 1-4 kHz so that the range of highest hearing sensitivity and speech intelligibility is optimally covered.

TABLE. 1

Exemplary design of a vacuum sound-absorber system for typical background sounds in aircraft

| | Octave band [Hz] | | | | | | | |
|---|---|---|---|---|---|---|---|---|
| | 63 | 125 | 250 | 500 | 1000 | 2000 | 4000 | 8000 |
| Acoustic insulation [dB] | 0 | 0 | 5 | 5 | 10 | 25 | 35 | 30 |

In order to guarantee the device's performance at the corresponding installation position it is imperative to use a sound absorber design that does not reduce the conveyance of media as a result of excessive flow resistance.

The following sound absorber designs for vacuum systems according to the invention meet aviation requirements and may be used in the described applications and in further applications.

Figure 4:
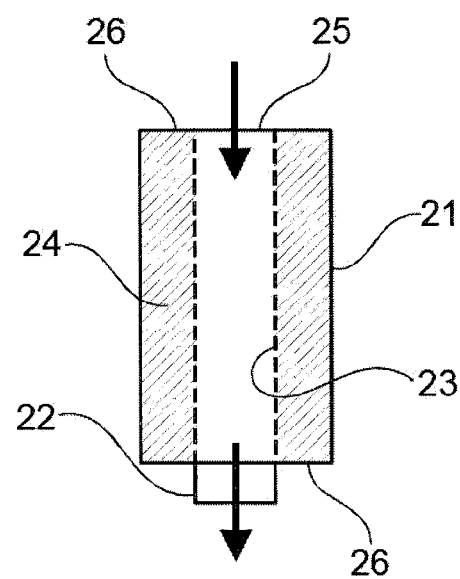
FIG. 4 diagrammatically shows the design of the pipe sound absorber with components.

The pipe sound absorber in FIG. 4, in this document also referred to as type 1, is of cylindrical design and basically comprises a sleeve of the pipe sound absorber or an external pipe 21 pipe connection element (or elements) 22, a perforated internal pipe 23, a bottom 26 of the sound absorber, as well as absorption material 24. The absorption material 24 is located between the sleeve of the pipe sound absorber and the perforated internal pipe. Access to the absorption material 24 is gained by removing the bottom 26 of the sound absorber and if applicable the sleeve 21 of the pipe sound absorber. The components of internal pipe 23 with pipe connection element 22, bottom 26 of the sound absorber and sleeve 21 of the pipe sound absorber may be designed so as to be mechanically detachable or fixed weldable.

Figure 5:
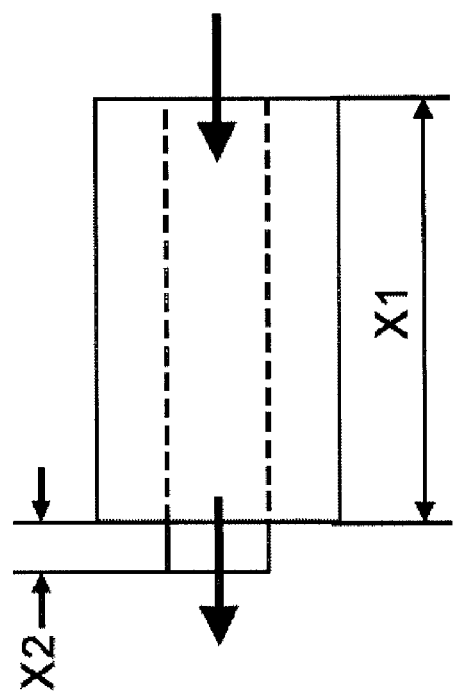
FIG. 5 diagrammatically shows the dimensions of the pipe sound absorber with design lengths.
Figure 6:
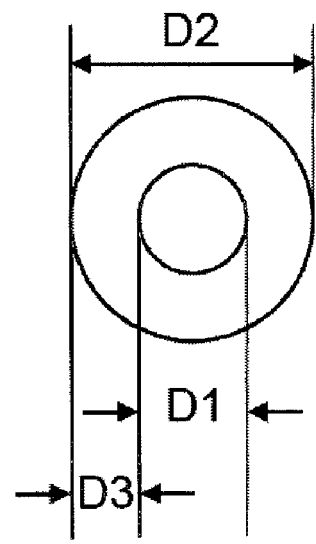
FIG. 6 diagrammatically shows the sound absorber dimensions with diameters/cross sections.

Sound absorption is achieved in that the sound, on the way through the fibres of the absorption material, releases its energy as a result of friction. The acoustic insulation of the sound pressure absorber or the effective frequency bandwidth within the octave bands may be significantly influenced by the length X1 of the sound absorber in the sound absorber, the thickness of the absorption material (difference between the external diameter D2 and the diameter D1 of the internal pipe), the percentage of perforation of the internal pipe (number and size of the holes in the internal pipe) and the absorption material (surface characteristics, density and flow resistance) (FIG. 5, FIG. 6). In the case of very substantial volume flows, for example, the following technical specifications have proven successful: D1: approx. 45 mm, D2: approx. 75 mm, X1: approx. 300 mm, X2: approx. 40 mm, internal pipe 23: perforated stainless steel sheet approx. 1 mm in thickness with a percentage of perforation of >50%. The technical specifications provided are merely stated as a guide; they may be specifically adapted to a given application without leaving the protective scope of the invention.

The sound absorber according to the invention comprises an internal pipe 23 and an external pipe 21, which pipes may withstand a maximum common vacuum pressure drop of 650 mbar and which are of correspondingly robust construction. The internal pipe 23 has a balanced relationship between the number and size of the holes, so as to achieve good passage of the sound waves to the absorption material 24 and little flow resistance. The absorption material 24 and the perforation match each other in order to prevent destroying (sucking in) absorption material 24. To further protect the absorption material it is, for example, possible to wrap a nonwoven material 24a as a barrier layer around the internal pipe 23 in order to protect the absorption material 24 in the pipe sound absorber volume against being "sucked in", abrasion, dirt build-up and moisture. For example, in a robust design the nonwoven material is made from stainless steel. It is also possible to use composite materials such as an absorption material 24 with a cover layer comprising a nonwoven material. Generally speaking, suitable absorption materials 24 include open-pore foams, e.g. Basotect or polyimide foams, or very fine open-pore structured fibres, e.g. mineral fibres, which have a high degree of absorption in the required frequency band and are resistant to moisture, dirt build-up and abrasion. The high flow speeds at a volume flow of approx. 120 l/s and the negative pressure (vacuum system) require increased stability of the sound absorber housing and of the device securing the absorption material. The higher the percentage of perforation in the perforated sheet, for example in the perforated internal pipe, the more important is the securing of the absorption material (barrier layer) to the flow-conducting end. An acoustically permeable barrier layer needs to be affixed between the absorption material and the perforated sheet. The sleeve of the pipe sound absorber and the bottoms of the pipe sound absorbers need to be designed in a correspondingly stable manner in order to meet mechanical qualification tests, for example aviation crash safety requirements, as well as to withstand the pressure of the vacuum system. Reducing the weight of the sound absorber makes it possible to correspondingly match in a weight-optimised manner the selection of materials and the dimensions of the sound absorber holders (which are usually located on the bottom of the pipe sound absorber).

Figure 7:
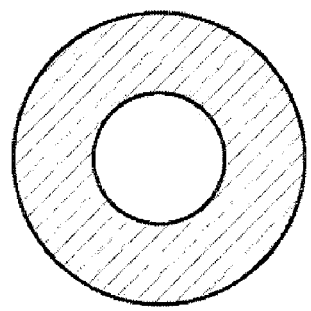
FIG. 7 diagrammatically shows the design of the pipe sound absorber with homogeneously distributed embedded absorption materials.
Figure 8:
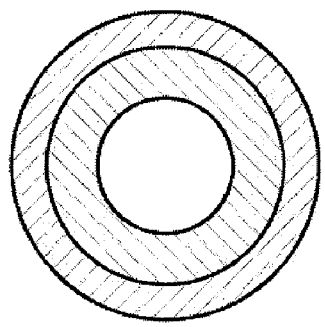
FIG. 8 diagrammatically shows the design of the pipe sound absorber with various homogeneously distributed embedded absorption materials.
Figure 9:
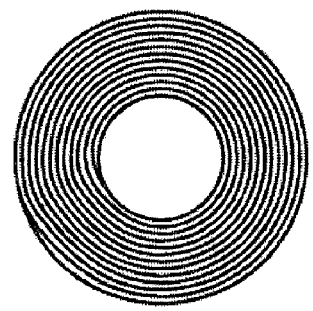
FIG. 9 diagrammatically shows the design of the pipe sound absorber with wound absorption materials.

The absorption materials 24 may be embedded in the volume of the pipe sound absorber in various ways. A homogeneously distributed embodiment (FIG. 7), a multi-layer embodiment (FIG. 8) and/or a wound embodiment (FIG. 9) may be implemented with the design of the pipe sound absorber. To achieve further weight savings by designing a sound absorber with a perforated internal pipe and enclosing absorption material, the absorption material may be wound around the internal pipe and may be radially bound, or a foam may surround said internal pipe as a moulded part. It is also possible to use several moulded parts, for example in a trapezoid shape or a rectangular shape, compare FIG. 13, which moulded parts are attached (clipped) by a quick-action fastener to the perforated internal pipe (among other things easy to renew during maintenance work).

In a further embodiment the described sound absorber may comprise a flow-optimised air inlet opening 25 in the form of an inlet funnel 28 so as to, at high flow speeds, prevent sound emissions at the air inlet opening 25 as a result of flow separation (turbulence). Such a design is shown in FIGS. 10 to 12. Sound emissions from the vacuum system or vacuum device, which sound emissions are attenuated by the absorption material, as well as sound emissions during aspiration at the sound absorber inlet itself, may in part be optimised, from the point of view of flow and acoustics, with the use of the measures according to FIGS. 10 and 11.

A pipe sound absorber with bi-directional flow through the sound absorber represents a further embodiment based on the pipe sound absorber of type 1. Such a sound absorber with a bi-directional through-flow is shown in FIG. 12 and is designated type 2. Bi-directional flow through the sound absorber makes it possible to reduce the flow speed at the air inlet 25 and to further reduce the sound emissions. The through-flow components of the sound absorber comprise the primary axial air throughput through the internal pipe 23 and the secondary radial air throughput through the outer sleeve 21 of the pipe sound absorber, the absorption material 24 and the perforated internal pipe 23. The radial air throughput may be set by the number and size of the holes in the internal pipe 23, in the external pipe 21 and by the density of the absorption material 24.

As is the case in the sound absorber type 1, in the sound absorber type 2 those corresponding absorption materials 24 are generally suitable that have a high degree of absorption in the required frequency band and that are resistant to humidity, dirt build-up and abrasion. In this context a robust design such as a combination comprising a nonwoven stainless steel material and a very fine fibre that is structured in an open-pore manner would appear to be particularly suitable.

Figures 13A, 13B:
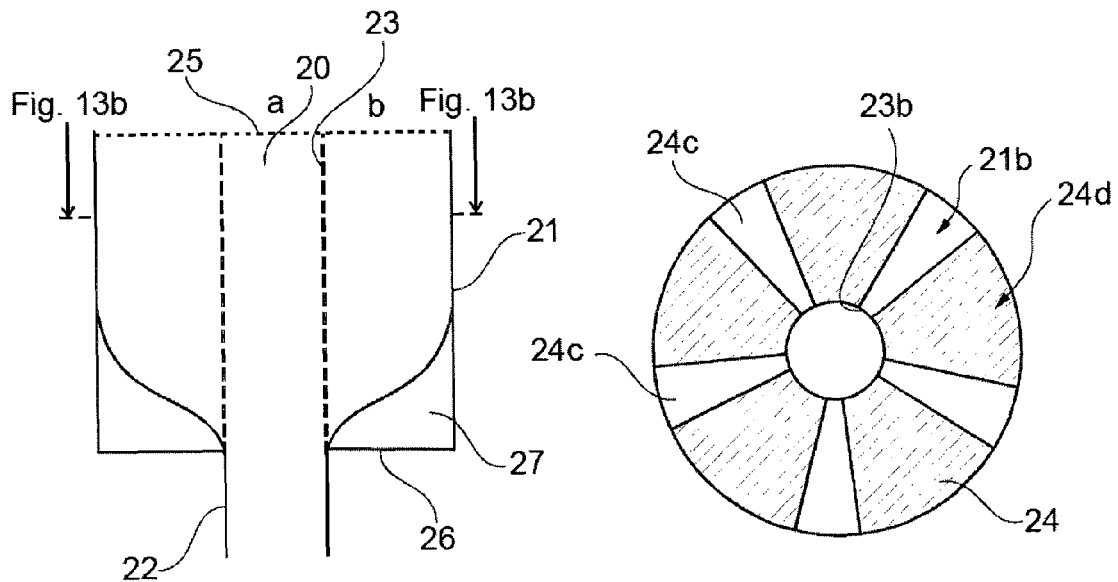
FIG. 13 diagrammatically shows a splitter sound absorber-pipe sound-absorber system type 3 for vacuum systems according to the invention.
Figures 14A, 14B:
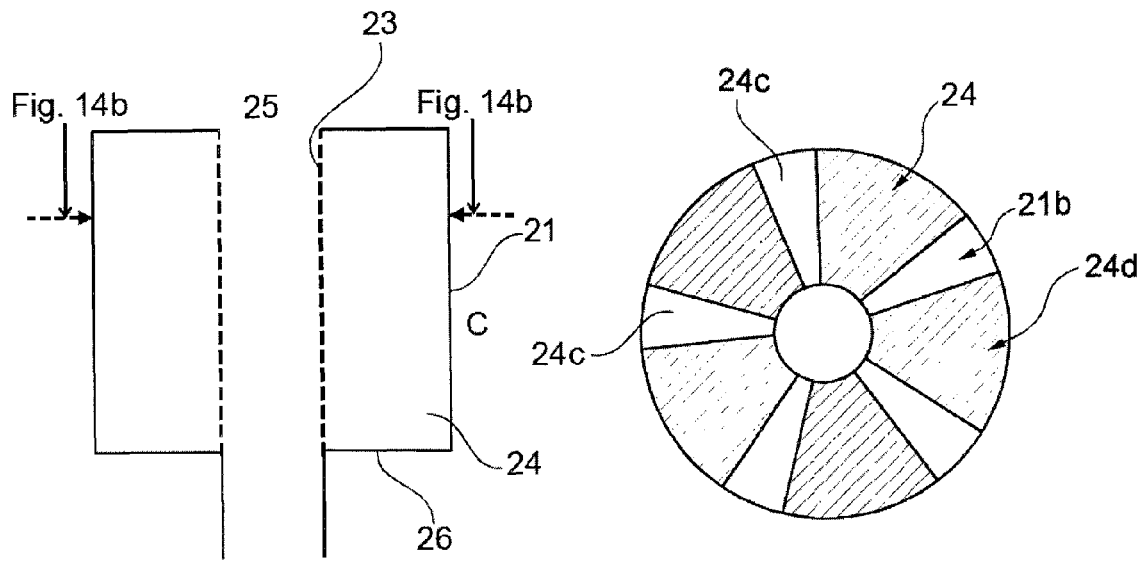
FIG. 14 diagrammatically shows a splitter sound absorber-pipe sound-absorber system type 4 for vacuum systems according to the invention.

Also possible is a design with wedge-shaped sound absorber splitters arranged around the internal pipe, as described as type 3 with reference to FIG. 13a and FIG. 13b and as type 4 with reference to FIG. 14a and FIG. 14b. In FIG. 13a and FIG. 13b the end of the internal pipe 23 is closed or open. The sound absorber cover is open, and the external wall 21 is designed as a splitter end. Furthermore, a flow guide 27 is provided. In this embodiment the effective aspiration cross section is increased by additional axial (type 3) or radial (type 4) aspiration of air. This may be used to reduce the inflow sound with comparable acoustic insulation of the entire sound absorber. If these splitters are designed as stabilising elements (e.g. splitter comprising solid foam wedges without any further reinforcement) of the sound absorber, in this way by reducing the material thickness of the sound absorber walls as well as the cover plates and also by leaving out material (cut-outs for air inflow in cover plates and sound absorber walls) a lightweight construction variant of the sound absorber may be implemented. In a further embodiment the sound absorber may be designed with a splitter comprising softer foam. This embodiment may require stabilisation of the splitter. With bi-directional flow through the sound absorber (compare FIG. 13) it is also possible to do without the sleeve of the pipe sound absorber by a structurally stable design so as to prevent "buckling" of the sleeve of the pipe sound absorber. The sound emission from the vacuum system or vacuum device may comprise tonal components which in the case of a wide-band sound absorber design (standard pipe sound absorber) may require voluminous absorption materials. The design size may be reduced if the perforated internal pipe according to the example of FIG. 13 features the air aspiration holes directly on the flanks of the absorption material, and the design of the absorption material of the splitters matches the frequencies of the tonal components in such a manner that a non-critical aspiration sound of the vacuum device is achieved. In FIG. 14a/b the end of the internal pipe 23a is open and the sound absorber cover is closed. In the region of the spaces between the splitters the external sleeve of the sound absorber is slotted or comprises perforated sheeting. The splitter 24d is designed in a manner analogous to the splitter sound absorber of FIG. 13a/b. The aspiration opening is designed as a gap or as perforated sheeting.

Figures 15A, 15B:
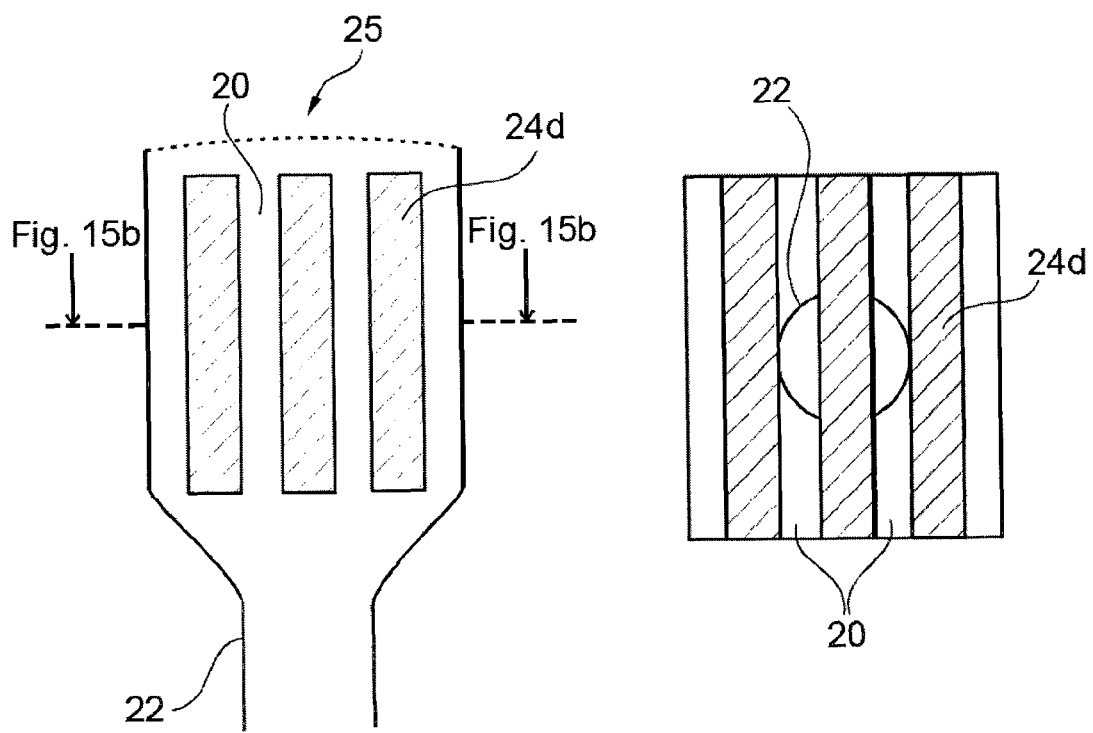
FIG. 15 diagrammatically shows a splitter sound absorber-pipe sound-absorber system type 5 for vacuum systems according to the invention.

FIG. 15 shows a sound absorber of a sagitally rectangular cross section. In this embodiment the end of the sound absorber is open or merely covered, for example, by a grille, so as not to impede the flow. The splitters 24d are plate-shaped, extending across the entire width.

Figure 16:
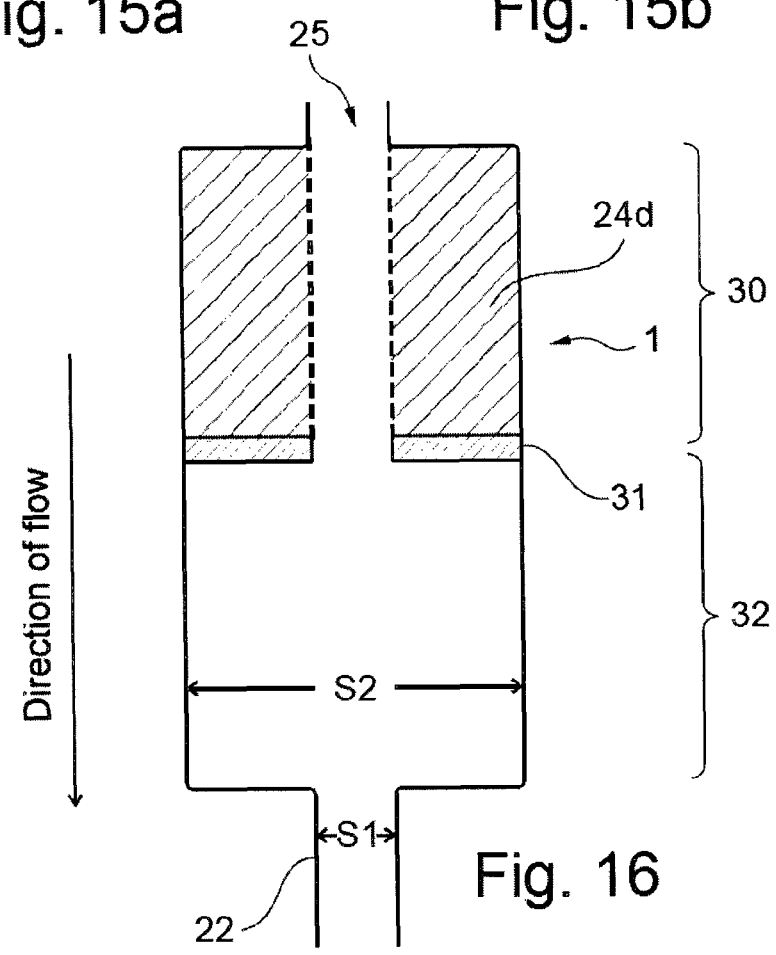
FIG. 16 diagrammatically shows a splitter sound absorber-pipe sound-absorber system type 6 for vacuum systems according to the invention.

A further embodiment provides a two-stage or multi-stage sound absorber, which is designated type 6. Said sound absorber may, for example, comprise a combination of an absorption attenuator 30 and a chamber attenuator 32 (reflection attenuator or resonance attenuator). In this arrangement an absorption attenuator according to types 1-5 together with a chamber attenuator 32 are placed in line in the pipe that is subjected to flow (compare FIG. 16). In this arrangement the chamber attenuator may be used to expand the effective frequency range of the sound absorber towards low frequencies if a corresponding absorption attenuator would have too thick an absorber thickness. Since in a chamber attenuator it is possible for high-frequency flow noises to arise, the chamber attenuator in principle needs to be arranged downstream of the absorption attenuator; in other words the absorption attenuator needs to be positioned between the chamber attenuator and the air inlet 25. Possible embodiments of a two-stage sound absorber include both sound absorber stages 30, 32 in one housing so as to obtain as compact a sound absorber as possible, or splitting them up for placement in two housings in order to make flexible installation possible. In the separate construction the two sound absorber stages may be designed more flexibly in relation to their external dimensions (no shared external diameter). Further design options of the sound absorber system are imaginable without leaving the scope of the invention. Below, as an example, various design options are mentioned. In FIG. 16 the absorption material comprises, for example, an effective length of >20 cm. The stabilisers 31 and the joint 31 between the sound absorbers 30, 32 are designed so as to be stable or rigid in order to prevent mutual influencing of their effectiveness. The length of the chamber attenuator is, for example, >20 cm and the cross-section ratio S2/S1 is at least four (preferably higher).

The absorption sound attenuator may be designed as a splitter sound absorber. Several sound absorbers, even of different designs, may be arranged in line in the direction of flow (for example absorption attenuator and chamber sound absorber). The chamber sound absorber may be used to expand the effective sound absorber range towards low frequencies. In this arrangement the reflection absorber should be arranged downstream of the absorption attenuator in order to prevent propagation of the flow sounds of the chamber sound absorber.

TABLE. 2

Acoustic insulation of a chamber sound absorber with a pipe-to-chamber cross section ratio of S1/S2 = 9 and a chamber length of l = 20 cm (according to Cremer/Möser "Technische Akustik")

| | Octave band [Hz] | | | | | | | |
|---|---|---|---|---|---|---|---|---|
| | 63 | 125 | 250 | 500 | 1000 | 2000 | 4000 | 8000 |
| Acoustic insulation [dB] | 0 | 6 | 11 | 12 | 9 | 13 | 6 | 11 |

Furthermore, several sound absorber designs may be combined in one sound absorber housing, for example absorption attenuators in line with chamber sound absorbers, in order to save weight and facilitate installation.

The described flow-optimising measures not only improve the arising sound emissions at the air inlet, but also improve the pressure loss of the sound absorber.

The invention may also be used in fields other than aviation, for example in the context of trains, ships or boats, or in building technology where vacuum toilets are also used, and in general in supply technology and process technology where there is a problem of reducing sound emissions and odour emissions in the field of fluid mechanics.

It should be noted that the term "comprising" does not exclude further elements or method-related steps, and that the term "a" or "one" does not exclude several elements or steps.

The reference characters used serve only to provide a better understanding; they should in no way be interpreted as limiting, wherein the scope of protection of the invention is defined by the claims.

| List of reference characters | |
|---|---|
| 1 | Sound absorber |
| 2 | Odour seal (optional) |
| 3 | Main flow line (bypass) |
| 4 | Secondary flow line |
| 5 | Discharge collection container |
| 6 | Triggering unit (flush switch) |
| 7 | Collection container |
| 8 | Ventilation pipe for collection container |
| 9 | Closure device for collection container (cover) |
| 10 | Spray nozzle(s)/spray ring |
| 11 | Flush valve |
| 12 | Suction valve |
| 13 | Control unit |

| List of reference characters | |
|---|---|
| 14 | Interface to other system(s) |
| 15 | Control unit (optional) |
| 19 | Pipe |
| 20 | Aspiration air duct |
| 21 | Internal wall |
| 21a | External pipe |
| 21b | External wall openings |
| 22 | Pipe connection element(s) |
| 23 | External wall |
| 23a | Internal pipe |
| 23b | Internal wall openings |
| 24 | Absorption material |
| 24a | Barrier layer |
| 24b | Clearance |
| 24c | Recesses |
| 24d | Splitters |
| 25 | Air inlet (opening) |
| 26 | Bottom of the pipe sound absorber |
| 27 | Flow guide device |
| 28 | Aspiration funnel |
| 29 | Resonance chamber |
| 30 | Pipe sound absorber |
| 31 | Separating element |
| 32 | Reflection sound absorber |

The invention claimed is:

1. A vacuum waste-water system sound-absorber comprising:
   an aspiration air duct;
   wherein the aspiration air duct is radially delimited by a pipe, wherein the pipe is delimited at an interior of the aspiration air duct by an internal wall and is delimited at an exterior of the aspiration air duct by an external wall;
   wherein the internal wall comprises openings in a radial direction;
   wherein the external wall comprises openings in a radial direction;
   wherein a sound-absorbent material is arranged between the internal wall and the external wall; and
   wherein the openings of the internal wall have a segment-shaped design, wherein the openings of the external wall have a segment-shaped design, and wherein in the sound-absorbent material includes continuous recesses arranged in a radial direction, each recess corresponding to an opening of the internal pipe and an opening of the external pipe.

2. The vacuum waste-water system sound-absorber, of claim 1, wherein the pipe is a double-walled pipe comprising an internal pipe and an external pipe, wherein the internal wall of the pipe is an internal pipe, and the external wall of the pipe is an external pipe, wherein the internal pipe is radially spaced apart from the external pipe.

3. The vacuum waste-water system sound-absorber of claim 2, wherein the openings of the internal pipe are designed as a two-dimensional perforation, wherein the openings of the external pipe are designed as a two-dimensional perforation, wherein the sound-absorbent material is arranged along the entire circumference between the internal pipe and the external pipe and is permeable to flowing air.

4. The vacuum waste-water system sound-absorber of claim 2, further comprising a barrier layer between the sound-absorbent material and the internal pipe.

5. The vacuum waste-water system sound-absorber of claim 2, wherein the internal pipe and the external pipe are positioned relative to each other by the sound-absorbent material.

6. The vacuum waste-water system sound-absorber of claim 2, wherein a free space is provided between the sound-absorbent material and the internal pipe.

7. The vacuum waste-water system sound-absorber of claim 1, wherein the sound-absorbent material comprises a plurality of splitters.

8. The vacuum waste-water system sound-absorber of claim 1, wherein the corresponding openings of the internal wall and of the external wall are circumferentially offset relative to each other, and the recesses have spiral-shaped design in a radial direction.

9. The vacuum waste-water system sound-absorber of claim 1, further comprising a connection stub for a vacuum waste-water system, wherein a flow guide device is arranged on the side of the aspiration air duct between the internal wall and the external wall, the flow guide device gradually tapering off towards the aspiration air duct.

10. The vacuum waste-water system sound-absorber of claim 1, further comprising a connection stub for a vacuum waste-water system, wherein the aspiration air duct on the side facing away from the connection stub comprises an aspiration opening that comprises an aspiration funnel that widens in an axially-outward direction.

11. The vacuum waste-water system sound-absorber of claim 1, further comprising a connection stub for a vacuum waste-water system and a resonance chamber between the aspiration air duct and the connection stub.

12. The vacuum waste-water system comprising a vacuum waste-water system sound-absorber of claim 1, wherein the vacuum waste-water system sound-absorber is coupled to an air aspiration pipe.

* * * * *